United States Patent
Zhou et al.

(10) Patent No.: US 11,405,809 B2
(45) Date of Patent: Aug. 2, 2022

(54) RADIO LINK MONITORING REFERENCE SIGNALS FOR UES THAT DO NOT SUPPORT CSI-RS BASED RADIO LINK MONITORING

(71) Applicant: QUALCOMM Incorporated, San Diego, CA (US)

(72) Inventors: Yan Zhou, San Diego, CA (US); Ruhua He, San Diego, CA (US); Stefan Brueck, Neunkirchen am Brand (DE); Yong Li, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 16/841,974

(22) Filed: Apr. 7, 2020

(65) Prior Publication Data
US 2020/0359243 A1    Nov. 12, 2020

Related U.S. Application Data

(60) Provisional application No. 62/845,294, filed on May 8, 2019.

(51) Int. Cl.
*H04W 24/08*     (2009.01)
*H04B 7/06*       (2006.01)
(Continued)

(52) U.S. Cl.
CPC .......... *H04W 24/08* (2013.01); *H04B 7/0626* (2013.01); *H04L 5/0051* (2013.01);
(Continued)

(58) Field of Classification Search
None
See application file for complete search history.

(56) References Cited

U.S. PATENT DOCUMENTS

2016/0278103 A1*  9/2016  Kazmi ............... H04W 72/085
2021/0136808 A1*  5/2021  Yang ..................... H04W 8/24

FOREIGN PATENT DOCUMENTS

WO      2020092723      5/2020

OTHER PUBLICATIONS

"3rd Generation Partnership Project; Technical Specification Group Radio Access Network; NR; User Equipment (UE) feature list (Release 15)", 3GPP Draft, DRAFT_R2-19XXXXX_TR_FEATURELIST_V3, 3rd Generation Partnership Project (3GPP), Apr. 30, 2019 (Apr. 30, 2019), XP051698640, pp. 1-63, Retrieved from the Internet: URL: http://www.3gpp.org/ftp/Email%5FDiscussions/RAN2/[RAN2%23105bis]/[105bis%2311][NR%5FR15]%20UE%20feature%20list%20TR, [retrieved on Apr. 30, 2019], Item #1.3, #1.7, p. 1-p. 2.

(Continued)

*Primary Examiner* — Saad Khawar
(74) *Attorney, Agent, or Firm* — Procopio, Cory, Hargreaves & Savitch

(57) ABSTRACT

A configuration to improve the manner in which a UE is configured to perform RLM for UEs that do not support CSI-RS based RLM. The apparatus may transmit, to a base station, an indication including a RLM capability. The apparatus may receive, from the base station, a RLM RS configuration from the UE based on the indication. The apparatus determines the RLM RS configuration for the UE, based on the RLM RS configuration received from the base station.

27 Claims, 7 Drawing Sheets

(51) Int. Cl.
*H04L 5/00* (2006.01)
*H04W 8/24* (2009.01)
*H04W 56/00* (2009.01)
*H04W 72/04* (2009.01)

(52) U.S. Cl.
CPC ............ *H04L 5/0094* (2013.01); *H04W 8/24* (2013.01); *H04W 56/001* (2013.01); *H04W 72/042* (2013.01)

(56) References Cited

OTHER PUBLICATIONS

Nokia, et al., "RLM Configuration Clarifications", 3GPP Draft, 3GPP TSG-RAN WG2 Meeting NR Adhoc 1807, R2-1810296 RLM Configuration Clarifications, 3rd Generation Partnership Project (3GPP), vol. RAN WG2, No. Montreal, Canada, Jul. 2, 2018-Jul. 6, 2018, Jul. 1, 2018 (Jul. 1, 2018), XP051467475, 3 pages, Retrieved from the Internet: URL: http://www.3gpp.org/ftp/Meetings%5F3GPP%5FSYNC/RAN2/Docs, [retrieved on Jul. 1, 2018], Section 2.

NTT DOCOMO, et al., "Maintenance for NR Mobility Procedure", 3GPP Draft, 3GPP TSG RAN WG1 Meeting #94, R1-1809136_Maintenance for NR Mobility Procedure Final, 3rd Generation Partnership Project (3GPP), vol. RAN WG1, No. Gothenburg, Sweden, Aug. 20, 2018-Aug. 24, 2018, Aug. 11, 2018 (Aug. 11, 2018), XP051516506, 8 Pages, Retrieved from the Internet: URL: http://www.3gpp.org/ftp/tsg%5Fran/WG1%5FRL1/TSGR1%5F94/Docs/R1%2D1809136%2Ezip [retrieved on Aug. 11, 2018], p. 5.

Partial International Search Report—PCT/US2020/027254—ISAEPO—dated Sep. 1, 2020.

International Search Report and Written Opinion—PCT/US2020/027254—ISA/EPO—dated Oct. 30, 2020.

\* cited by examiner

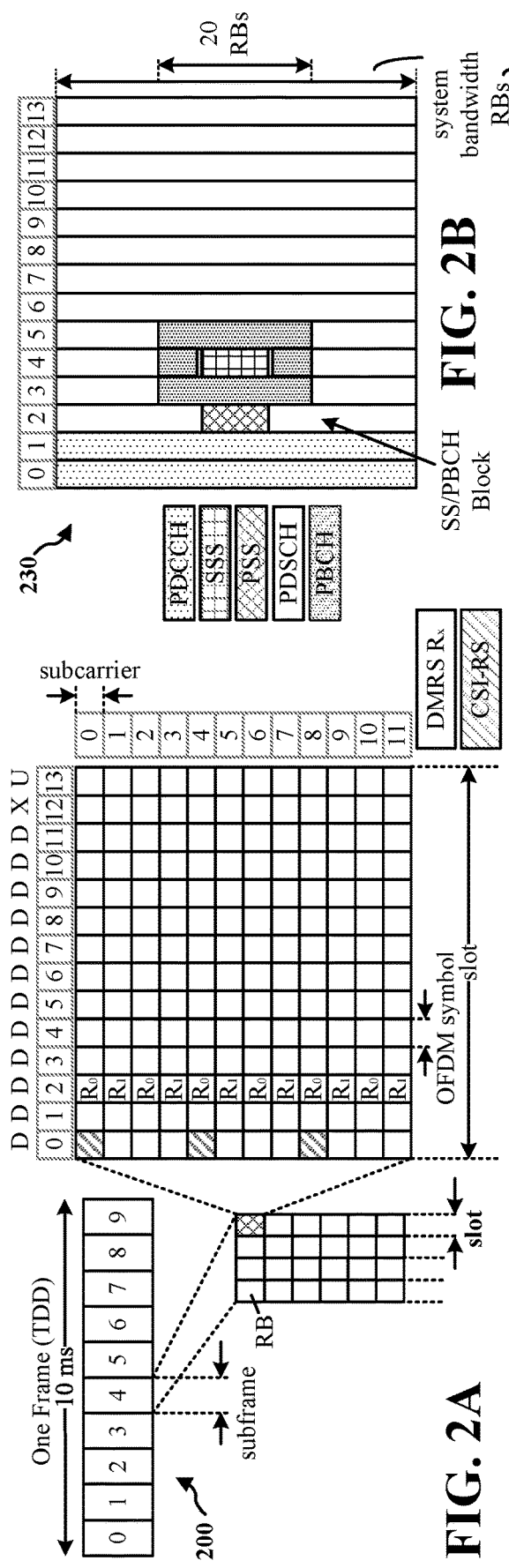
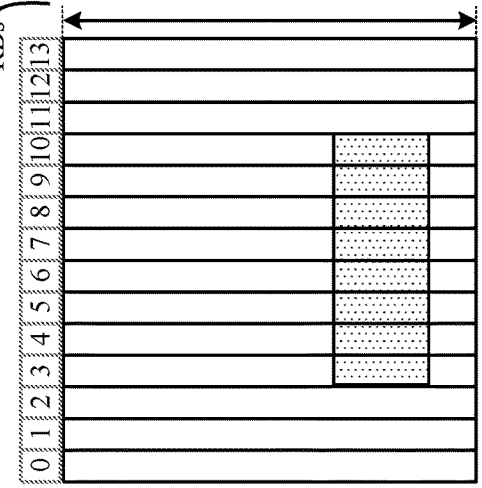
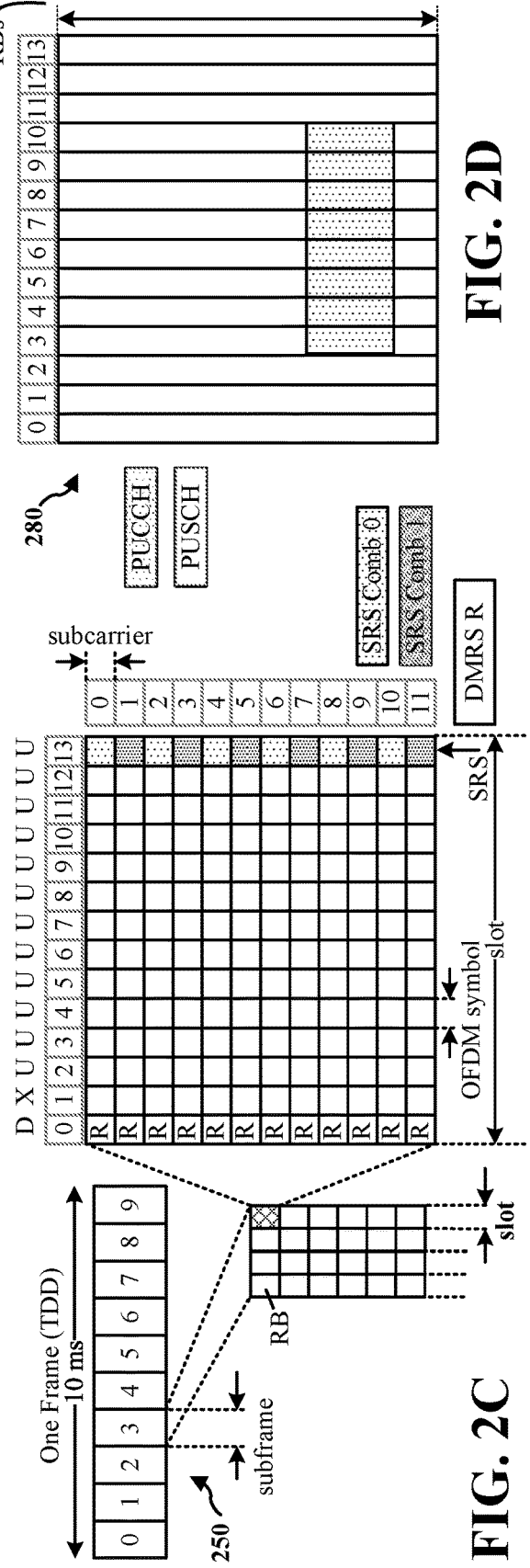
FIG. 2A  FIG. 2B  FIG. 2C  FIG. 2D

RADIO LINK MONITORING REFERENCE SIGNALS FOR UES THAT DO NOT SUPPORT CSI-RS BASED RADIO LINK MONITORING

CROSS REFERENCE TO RELATED APPLICATION(S)

This application claims the benefit of U.S. Provisional Application Ser. No. 62/845,294, entitled "Radio Link Monitoring Reference Signals For UEs That Do Not Support CSI-RS Based Radio Link Monitoring" and filed on May 8, 2019, which is expressly incorporated by reference herein in its entirety.

BACKGROUND

Technical Field

The present disclosure relates generally to communication systems, and more particularly, to radio link monitoring.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The disclosure relates to improving the manner in which a UE may be configured to perform radio link monitoring (RLM) for UEs that do not support channel state information reference signal (CSI-RS) based RLM. In an aspect of the disclosure, a method is provided for configuring a UE to perform RLM. The method includes transmitting, to a base station, an indication from a UE, the indication including a RLM capability. The method includes receiving, from the base station, a RLM RS configuration for the UE, based on the indication sent from the UE. The method includes, determining the RLM RS configuration for the UE based on the RLM RS configuration received from the base station.

In an aspect of the disclosure, a method, a computer-readable medium, and an apparatus are provided. The apparatus may transmit, to a base station, an indication including a radio link monitoring (RLM) capability. The apparatus may receive, from the base station, a RLM reference signal (RS) configuration for the UE, based on the indication. The apparatus may determine the RLM RS configuration for the UE, based on the RLM RS configuration received from the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
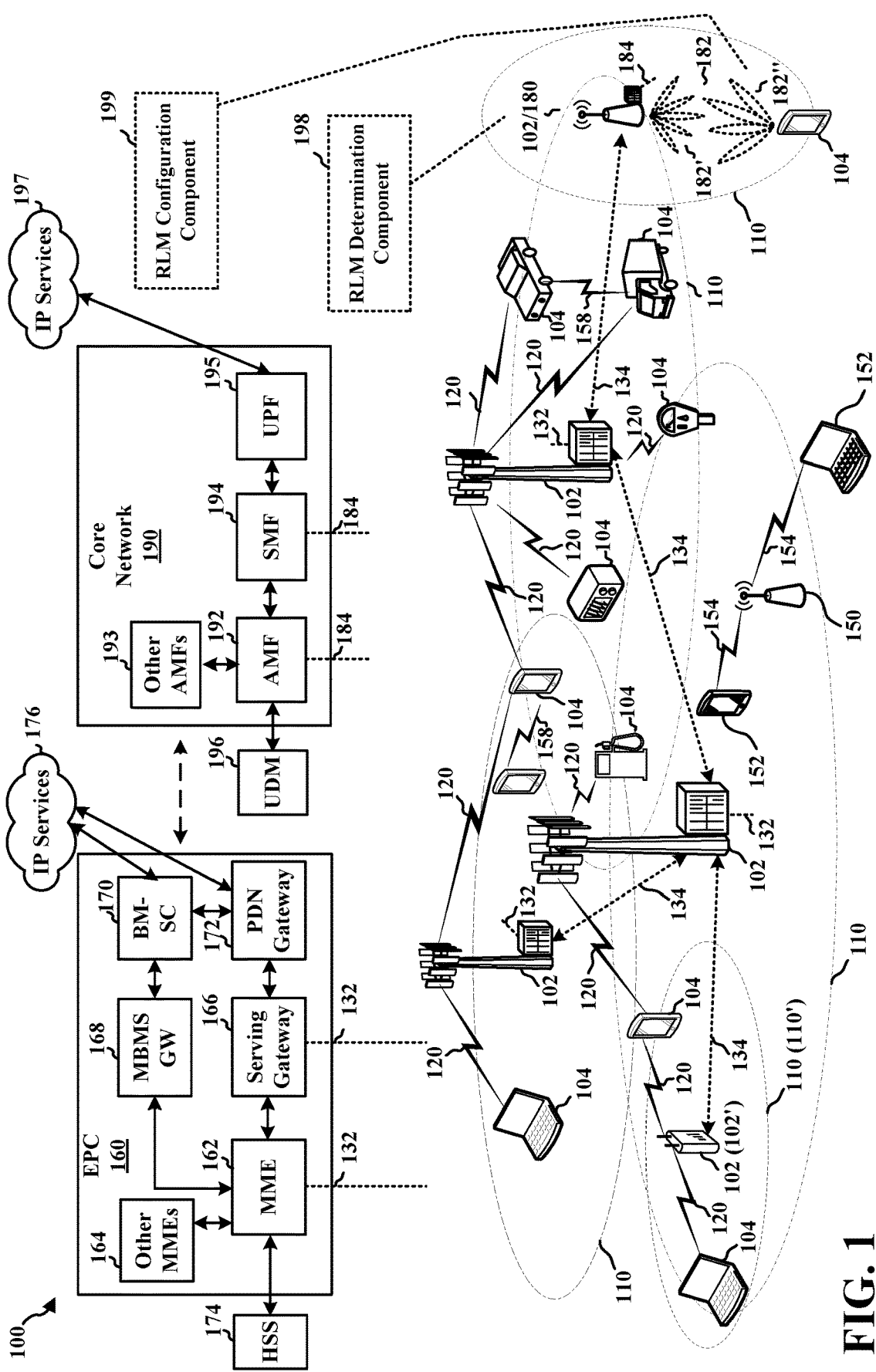
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to determine the RLM configuration to use for the UE based on a RLM RS configuration received from the base station. For example, the UE 104 of FIG. 1 may include a RLM determination component 198 configured to determine the RLM RS configuration the UE is to use to perform RLM.

Referring again to FIG. 1, in certain aspects, the base station 180 may be configured to process a report from a UE 104 to assist the base station in providing a RLM configuration to the UE. For example, the base station 102/180 of FIG. 1 may include a RLM configuration component 199 configured to receive the report from the UE to provide the RLM configuration for the UE, based on the report from the UE, such that the UE may perform RLM.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIGs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
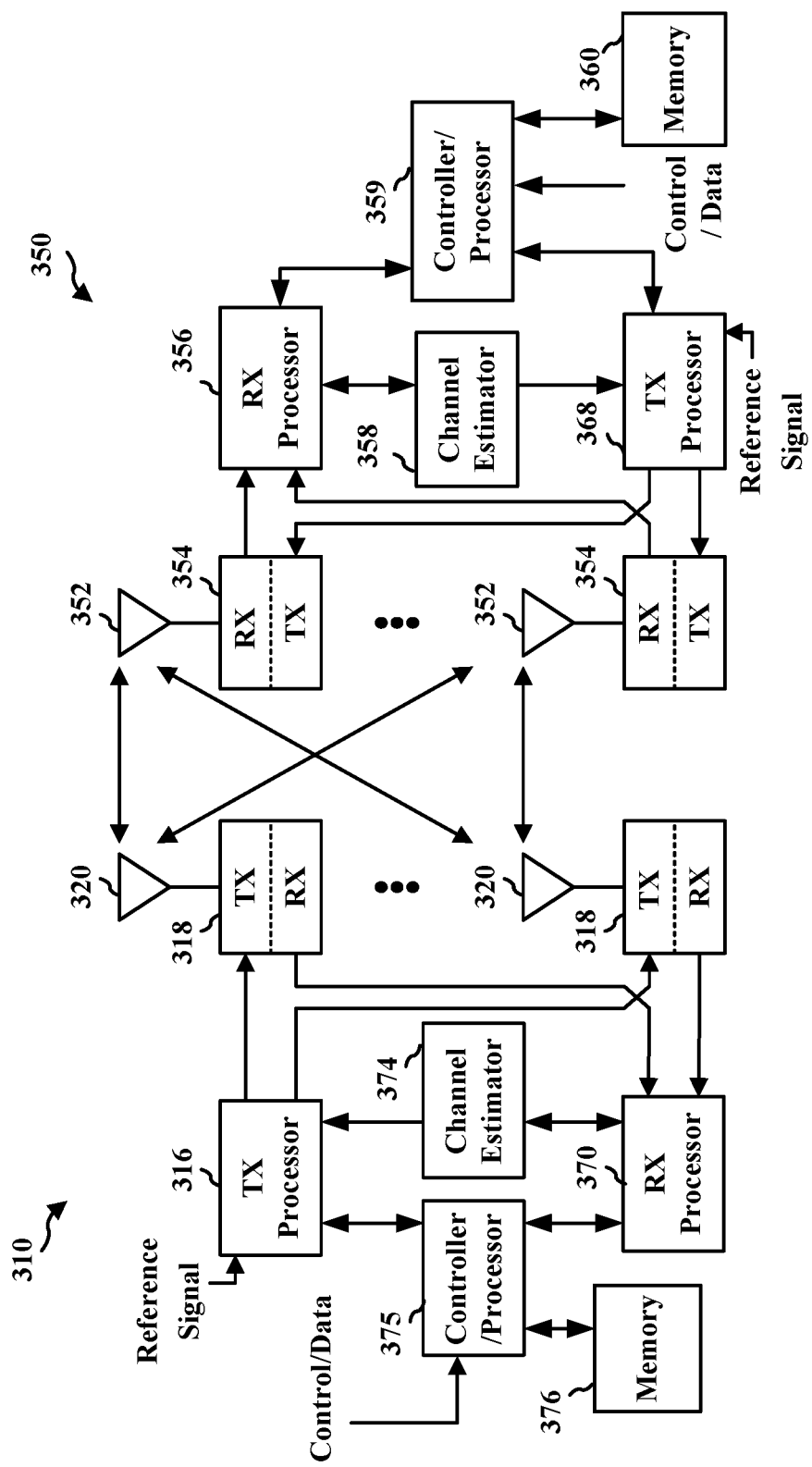
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a RRC layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, Ms), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 199 of FIG. 1.

At least one of the TX processor 316, the RX processor 370, and the controller/processor 375 may be configured to perform aspects in connection with 198 of FIG. 1.

The downlink radio link quality of a primary cell (e.g., PDCCH) may be monitored by a UE for the purpose of indicating out of sync or in sync status to higher layers. The UE may monitor the active downlink bandwidth part (BWP) on the primary cell. The UE may be provided with a set of resource indexes, such as, a channel state information reference signal (CSI-RS) resource configuration index or a synchronization signal block (SSB) block index, to perform radio link monitoring (RLM). A UE performing RLM may determine the quality of a radio link, and may help to reduce the number of radio link failures, thereby reducing service interruptions of the UE.

In instances where the UE is not provided with the resource indexes to perform RLM and the UE is provided for PDCCH receptions transmission configuration indicator (TCI) states that include one or more of a CSI-RS, the UE in some instances may use for RLM the RS provided for the active TCI state for PDCCH reception.

However, some UEs may not be configured to support CSI-RS based RLM, including radio link failure detection (e.g., cell level failure) and/or beam failure detection (e.g., beam level failure). UEs may be configured to provide a capability signal to the network (e.g., base station) within a certain period (e.g., initial deployment phase) indicating that the UE may not be configured to support CSI-RS based RLM. In some instances, if the RLM RS is not explicitly configured by RRC, the RLM RS is considered to be implicitly configured, such that RLM RS is periodic CSI-RS. When not explicitly configured, the RLM RS per monitored control resource set (CORESET) is one periodic CSI-RS in the TCI state of the monitored CORESET. For example, the UE may use for RLM the RS provided in the TCI state for periodic CSI-RS, when there is one RS. In another example, when there are two RSs in the TCI state and the quasi co-location (QCL) TypeD is periodic CSI-RS, the UE uses the RS with the QCL TypeD for RLM. In implicitly configured RLM RS, the RS may typically be periodic CSI-RS. However, this may imply that implicitly configured RLM RS may not be used by UEs that do not support CSI-RS based RLM.

The present disclosure relates to improving the manner in which a UE may be configured to perform RLM for UEs that do not support CSI-RS based RLM, but may support synchronization signal block (SSB) based RLM. For example, a RLM RS selection rule for UEs that do not support CSI-RS based RLM. The present disclosure allows a UE to transmit an indication to a base station, the indication including a RLM capability. In some aspects, the RLM capability within the indication may be utilized by the base station to determine a RLM configuration for the UE. The UE may receive, from the base station, a RLM RS configuration for the UE, based on the indication. The UE may determine the RLM RS configuration for the UE, based on the RLM RS configuration received from the base station, such that the UE may be configured to perform RLM in accordance to the RLM configuration.

Figure 4:
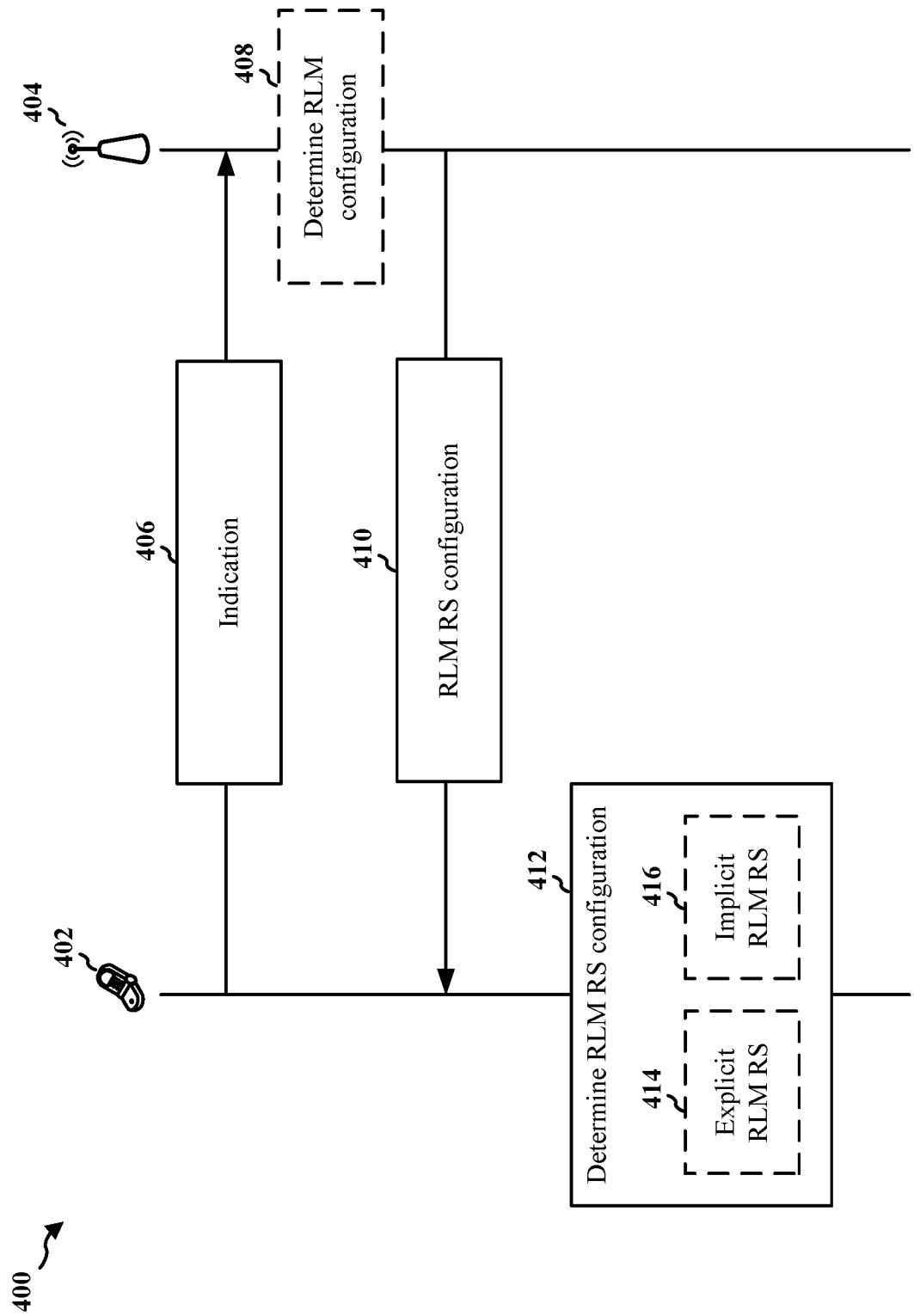
FIG. 4 is a call flow diagram of signaling between a UE and a base station in accordance with certain aspects of the disclosure.

FIG. 4 is a call flow diagram of signaling between a UE and a base station in accordance with certain aspects of the disclosure. The diagram 400 of FIG. 4 includes a UE 402 and a base station 404. The base station 404 may be configured to provide a cell. For example, in the context of FIG. 1, the base station 404 may correspond to base station 102/180 and, accordingly, the cell may include a geographic coverage area 110 in which communication coverage is provided and/or small cell 102' having a coverage area 110'. Further, a UE 402 may correspond to at least UE 104. In another example, in the context of FIG. 3, the base station 404 may correspond to the base station 310 and the UE 402 may correspond to UE 350. Optional aspects are illustrated with a dashed line.

The UE 402 may transmit an indication 406 to the base station 404. The indication 406 may provide a list of the capabilities of the UE 402 to the base station 404. The indication 406 may be transmitted to the base station 404 within a certain time period. In some aspects, the indication 406 may be transmitted to the base station 404, such as but not limited to, during the initial deployment phase of the UE. In some aspects, the indication 406 may be transmitted to the base station 404 at other times.

Various UEs may or may not support some or all of the same features. In some aspects, the indication 406 may provide a RLM capability of the UE to the base station. The RLM capability may indicate to the base station 404, the type of RLM capability supported by the UE 402. For example, the RLM capability may indicate that the UE 402 may support CSI-RS based RLM or SSB based RLM. In some aspects, the RLM capability may indicate that the UE 402 does not support CSI-RS based RLM, but does support SSB based RLM. In such instances, the base station 404 receives the indication 406 and, at 408, may be configured to determine the RLM configuration for the UE 402. The RLM configuration for the UE 402 may be based on the indication 406 received from the UE 402. As such, the base station 404, in some aspects, may utilize the information within the indication 406 to determine 408 the RLM configuration for the UE 402.

The base station 404 may transmit a RLM RS configuration 410 to the UE (e.g., 402). The UE 402 receives the RLM RS configuration 410 and may be configured to determine the RLM RS configuration 412 to perform RLM based on the RLM RS configuration 410 received from the base station 404. As such, the UE 403 performs RLM in accordance with the RLM RS configuration received from the base station (e.g., 404).

In some aspects, in order for the UE 402 to determine the RLM RS configuration to use to perform RLM, the UE 402 may be configured to select at least one of explicit RLM RS 414 as a SSB or implicit RLM RS 416 as a SSB, if the RLM capability within the indication 406 indicates that the UE 402 supports SSB based RLM. In some aspects, the RLM capability of the indication 406 may indicate that the UE 402 does not support CSI-RS based RLM. The UE 402 may use explicit RLM RS 414 instead of using implicitly configured RLM RS 416, which as discussed above may typically be periodic CSI-RS. In aspects where the UE 402 uses implicit RLM RS 416 as SSB, the SSB may serve as a QCL source for the periodic CSI-RS in a TCI state of the monitored CORESET. In some aspects, the periodic CSI-RS may be utilized if one RS is in the TCI state. In some aspects, a QCL-TypeD RS may be utilized as the periodic CSI-RS, if there are two RSs in the TCI state. In some aspects, the RLM RS may be utilized for radio link failure detection. In some aspects, the RLM RS may be utilized for beam failure detection.

Figure 5:
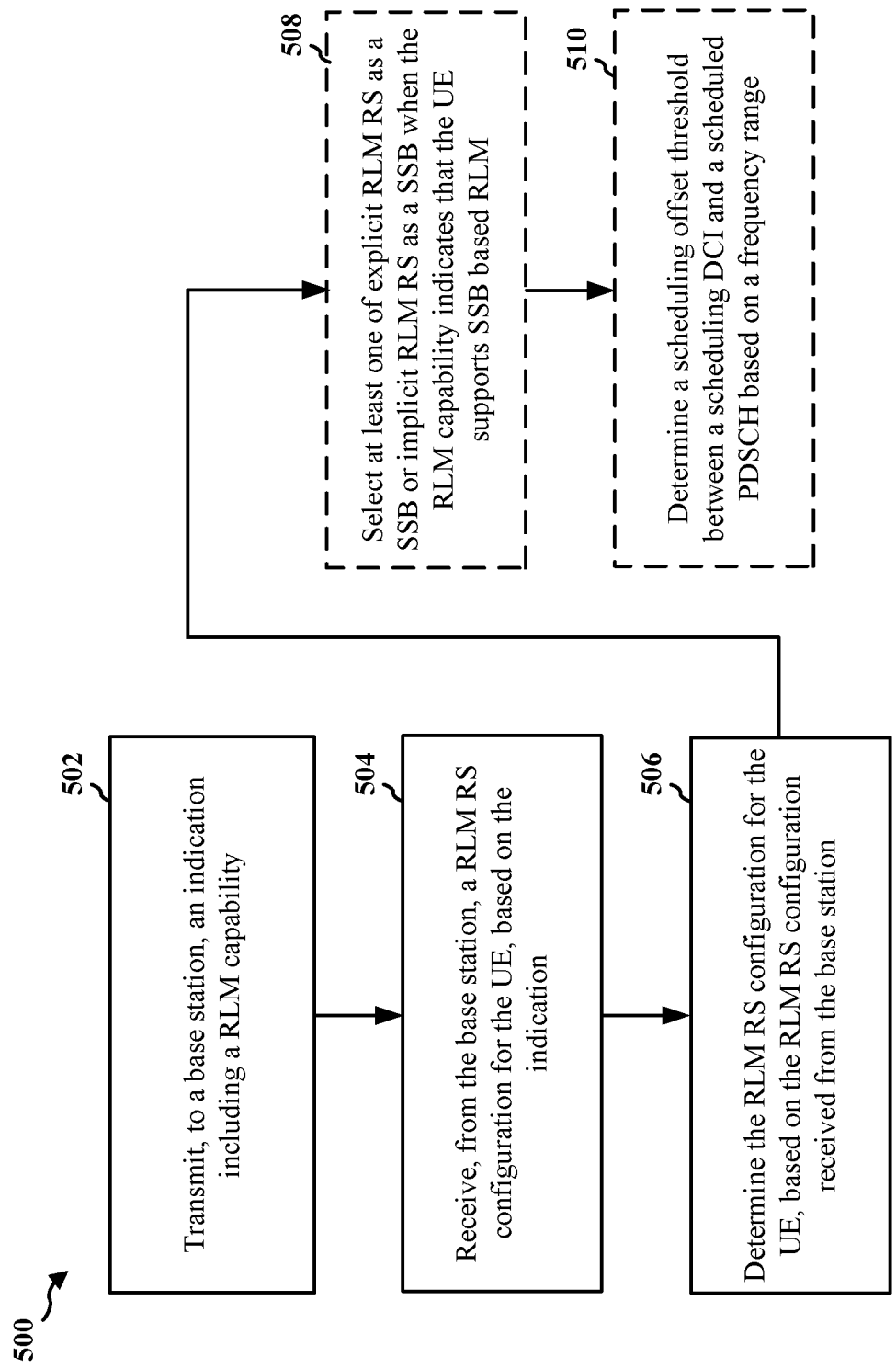
FIG. 5 is a flowchart of a method of wireless communication.

FIG. 5 is a flowchart 500 of a method of wireless communication. The method may be performed by a UE or a component of a UE (e.g., the UE 104, 350, 402; the apparatus 600/600'; the processing system 714, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may enable a UE to determine a RLM RS configuration to perform RLM.

At 502, the UE may transmit, to a base station (e.g., 404), an indication (e.g., 406). For example, 502 may be performed by indication component 606 of apparatus 602. The indication (e.g., 406) may include a RLM capability of the UE.

At 504, the UE may receive a RLM RS configuration (e.g., 410) based on the indication (e.g., 406) sent by the UE (e.g., 402). For example, 504 may be performed by configuration component 608 of apparatus 602. The UE may receive the RLM RS configuration from the base station. The RLM RS configuration may be based on the indication sent to the base station by the UE.

At 506, the UE may determine the RLM RS configuration (e.g., 412) for the UE. For example, 506 may be performed by determination component 610 of apparatus 602. The UE may determine the RLM RS configuration based on the RLM RS configuration received from the base station.

In some aspects, for example at 508, the UE may select at least one of explicit RLM RS or implicit RLM RS. For example, 508 may be performed by selection component 612 of apparatus 602. The UE may select at least one of explicit RLM RS as a SSB or implicit RLM RS as a SSB. The RLM capability may indicate that the UE may support SSB based RLM. In some aspects, the RLM capability may indicate that the UE may not be configured to support CSI-RS based RLM. In some aspects, the implicit RLM RS may serve as a QCL source for periodic CSI-RS in a TCI state of a monitored CORESET. In some aspects, the periodic CSI-RS may be utilized when one RS is in the TCI state. In some aspects, a QCL-TypeD RS may be utilized when two RSs are in the TCI state. In some aspects, the RLM RS may be at least one of a radio link failure detection or a beam failure detection.

In some aspects, for example at 510, the UE may determine a scheduling offset threshold. For example, 510 may be performed by threshold component 614 of apparatus 602. The UE may need a certain amount of time to decode a DCI scheduling a PDSCH and apply indicated instructions to the scheduled PDSCH. As such, a threshold on the scheduling between the DCI and the scheduled PDSCH may be defined. Such threshold, e.g., Threshold-Sched-Offset, may be frequency dependent. The UE may determine the scheduling offset threshold between a scheduling DCI and a scheduled PDSCH. The UE may determine the scheduling offset threshold between the scheduling DCI and the scheduled PDSCH based on a frequency range. In some aspects, at least part of the instructions in the scheduling DCI may not be applied to the scheduled PDSCH if the scheduling offset is less than a threshold. In some aspects, the frequency range may at least include frequency range 1 (FR1), which may be less than 6 GHz, and have a corresponding threshold of 0 milliseconds. In some aspects, the frequency range may at least include frequency range 2 (FR2), which may be greater than 6 GHz, and may have a corresponding threshold of 0.125 milliseconds (ms) or 0.25 ms for a subcarrier spacing (SCS) of 120 kHz, based on the UE capability.

Figure 6:
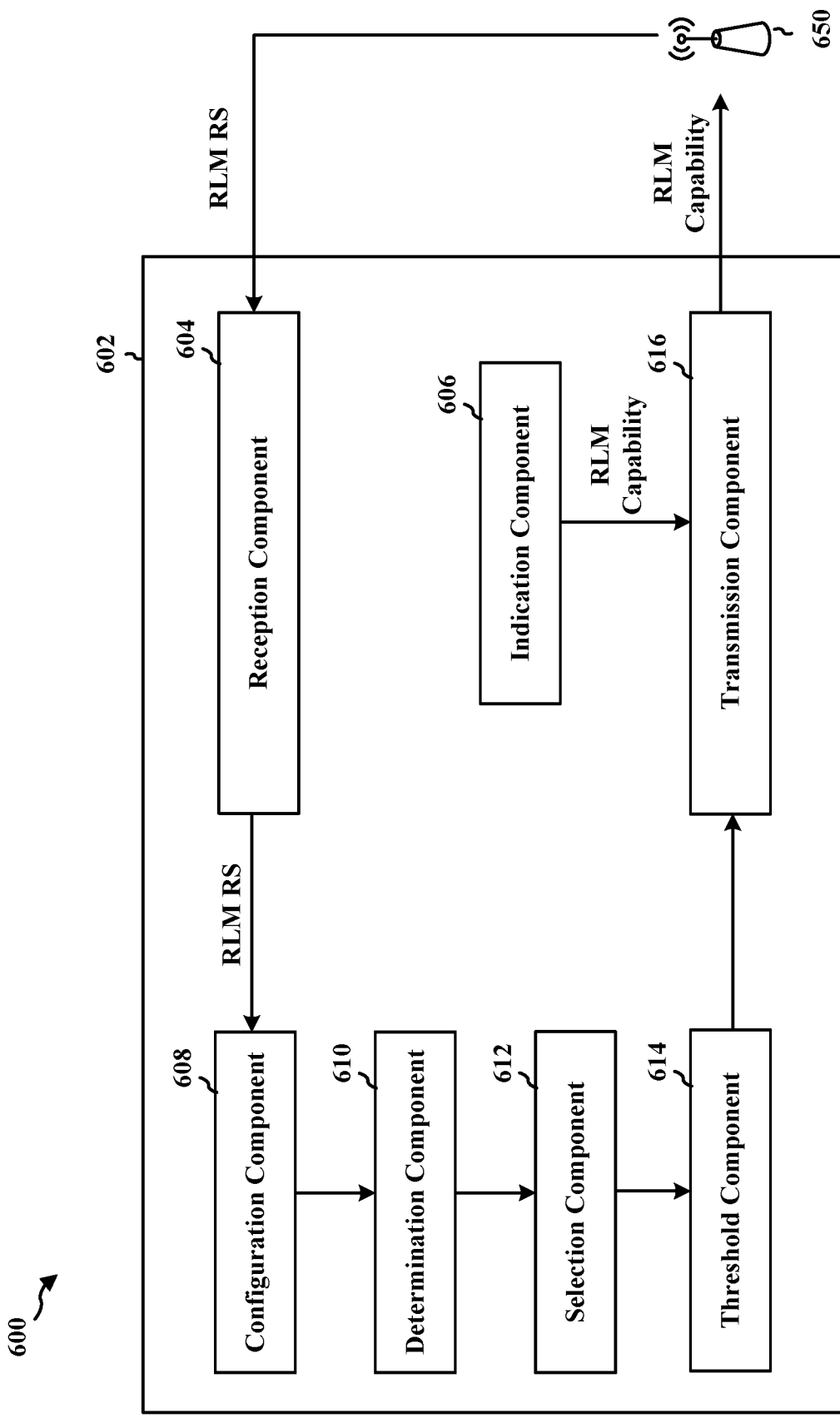
FIG. 6 is a conceptual data flow diagram illustrating the data flow between different means/components in an example apparatus.

FIG. 6 is a conceptual data flow diagram 600 illustrating the data flow between different means/components in an example apparatus 602. The apparatus may be a UE or a component of a UE. The apparatus may perform the method of flowchart 500. The apparatus includes a reception component 604 that may be configured to receive various types of signals/messages and/or other information from other devices, including, for example, the base station 650. The apparatus includes an indication component 606 that may be configured to transmit, to a base station, an indication including a RLM capability, e.g., as described in connection with 502 of FIG. 5. The apparatus includes a configuration component 608 that may be configured to receive, from the base station, a RLM RS configuration for the UE, e.g., as described in connection with 504 of FIG. 5. The apparatus includes a determination component 610 that may be configured to determine the RLM RS configuration for the UE, e.g., as described in connection with 506 of FIG. 5. The apparatus includes a selection component 612 that may be configured to select at least one of explicit RLM RS as a SSB or implicit RLM RS as a SSB, e.g., as described in connection with 508 of FIG. 5. The apparatus includes a threshold component 614 that may be configured to determine a scheduling offset threshold between a scheduling DCI and a scheduled PDSCH based on a frequency range, e.g., as described in connection with 510 of FIG. 5. The apparatus includes a transmission component 616 may be configured to transmit various types of signals/messages and/or other information to other devices, including, for example, the base station 650.

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
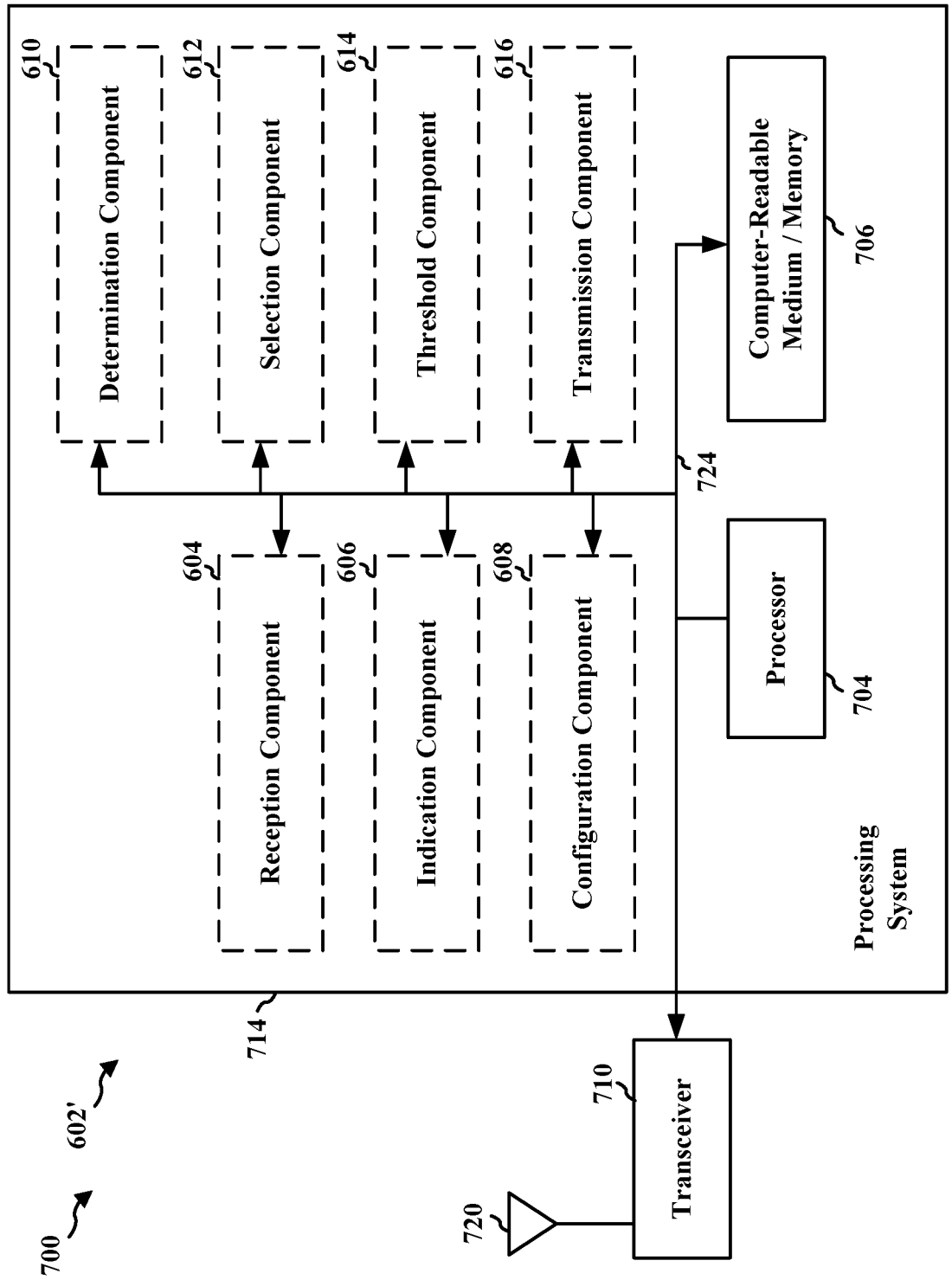
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 606, 608, 610, 612, 614, 616 and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 604. In addition, the transceiver 710 receives information from the processing system 714, specifically the transmission component 616, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 606, 608, 610, 612, 614, 616. The components may be software components running in the processor 704, resident/stored in the computer readable medium/memory 706, one or more hardware components coupled to the processor 704, or some combination thereof. The processing system 714 may be a component of the UE 350 and may include the memory 360 and/or at least one of the TX processor 368, the RX processor 356, and the controller/processor 359. Alternatively, the processing system 714 may be the entire UE (e.g., see 350 of FIG. 3).

In one configuration, the apparatus 602/602' for wireless communication includes means for transmitting, to a base station, an indication including a RLM. The apparatus includes means for receiving, from the base station, a RLM reference signal (RS) configuration for the UE, based on the indication. The apparatus includes means for determining the RLM RS configuration for the UE, based on the RLM RS configuration received from the base station. The apparatus further includes means for selecting at least one of explicit RLM RS as a SSB or implicit RLM RS as a SSB, when the RLM capability indicates that the UE supports SSB based RLM. The apparatus further includes means for determining a scheduling offset threshold between a scheduling DCI and a scheduled PDSCH based on a frequency range. The aforementioned means may be one or more of the aforementioned components of the apparatus 602 and/or the processing system 714 of the apparatus 602' configured to perform the functions recited by the aforementioned means. As described supra, the processing system 714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
    transmitting, to a base station, an indication including a radio link monitoring (RLM) capability;
    receiving, from the base station, a RLM reference signal (RS) configuration for the UE, based on the indication; and
    determining the RLM RS configuration for the UE, based on the RLM RS configuration received from the base station, wherein the determining the RLM RS configuration comprises selecting at least one of explicit RLM RS as a synchronization signal block (SSB) or implicit RLM RS as a SSB, when the RLM capability indicates that the UE supports SSB based RLM.

2. The method of claim 1, wherein the RLM capability indicates that the UE does not support channel state information reference signal (CSI-RS) based RLM.

3. The method of claim 1, wherein the implicit RLM RS serves as a quasi co-location (QCL) source for a periodic channel state information reference signal (CSI-RS) in a transmission configuration indicator (TCI) state of a monitored control resource set (CORESET).

4. The method of claim 3, wherein the periodic CSI-RS is utilized when one RS is in the TCI state.

5. The method of claim 3, wherein a QCL-TypeD RS is utilized when two RS are in the TCI state.

6. The method of claim 1, wherein the RLM RS is at least one of a radio link failure detection or a beam failure detection.

7. The method of claim 1, further comprising:
    determining a scheduling offset threshold between a scheduling DCI and a scheduled PDSCH based on a frequency range.

8. The method of claim 7, wherein at least part of instructions in the scheduling DCI is not applied to the scheduled PDSCH if a scheduling offset between the scheduling DCI and the scheduled PDSCH is less than the scheduling offset threshold.

9. The method of claim 7, wherein the frequency range at least includes frequency range 1 (FR1), which is below 6 GHz, wherein the scheduling offset threshold comprises 0 millisecond.

10. The method of claim 7, wherein the frequency range at least includes frequency range 2 (FR2), which is above 6 GHz, wherein the scheduling offset threshold comprises 0.125 ms or 0.25 ms for a subcarrier spacing (SCS) of 120 kHz.

11. An apparatus for wireless communication at a user equipment (UE), comprising:
a memory; and
at least one processor coupled to the memory and configured to:
transmit, to a base station, an indication including a radio link monitoring (RLM) capability;
receive, from the base station, a RLM reference signal (RS) configuration for the UE, based on the indication; and
determine the RLM RS configuration for the UE, based on the RLM RS configuration received from the base station, wherein to determine the RLM RS configuration, the at least one processor is configured to select at least one of explicit RLM RS as a synchronization signal block (SSB) or implicit RLM RS as a SSB, when the RLM capability indicates that the UE supports SSB based RLM.

12. The apparatus of claim 11, wherein the RLM capability indicates that the UE does not support channel state information reference signal (CSI-RS) based RLM.

13. The apparatus of claim 11, wherein the implicit RLM RS serves as a quasi co-location (QCL) source for a periodic channel state information reference signal (CSI-RS) in a transmission configuration indicator (TCI) state of a monitored control resource set (CORESET).

14. The apparatus of claim 13, wherein the periodic CSI-RS is utilized when one RS is in the TCI state.

15. The apparatus of claim 13, wherein a QCL-TypeD RS is utilized when two RS are in the TCI state.

16. The apparatus of claim 11, wherein the RLM RS is at least one of a radio link failure detection or a beam failure detection.

17. The apparatus of claim 11, wherein the at least one processor is configured to:
determine a scheduling offset threshold between a scheduling DCI and a scheduled PDSCH based on a frequency range.

18. The apparatus of claim 17, wherein at least part of instructions in the scheduling DCI is not applied to the scheduled PDSCH if a scheduling offset between the scheduling DCI and the scheduled PDSCH is less than the scheduling offset threshold.

19. The apparatus of claim 17, wherein the frequency range at least includes frequency range 1 (FR1), which is below 6 GHz, wherein the scheduling offset threshold comprises 0 millisecond.

20. The apparatus of claim 17, wherein the frequency range at least includes frequency range 2 (FR2), which is above 6 GHz, wherein the scheduling offset threshold comprises 0.125 ms or 0.25 ms for a subcarrier spacing (SCS) of 120 kHz.

21. An apparatus for wireless communication at a user equipment (UE), comprising:
means for transmitting, to a base station, an indication including a radio link monitoring (RLM) capability;
means for receiving, from the base station, a RLM reference signal (RS) configuration for the UE, based on the indication; and
means for determining the RLM RS configuration for the UE, based on the RLM RS configuration received from the base station, wherein the means for determining the RLM RS configuration is configured to select at least one of explicit RLM RS as a synchronization signal block (SSB) or implicit RLM RS as a SSB, when the RLM capability indicates that the UE supports SSB based RLM.

22. The apparatus of claim 21, wherein the RLM capability indicates that the UE does not support channel state information reference signal (CSI-RS) based RLM.

23. The apparatus of claim 21, wherein the implicit RLM RS serves as a quasi co-location (QCL) source for a periodic channel state information reference signal (CSI-RS) in a transmission configuration indicator (TCI) state of a monitored control resource set (CORESET).

24. The apparatus of claim 23, wherein the periodic CSI-RS is utilized when one RS is in the TCI state.

25. The apparatus of claim 23, wherein a QCL-TypeD RS is utilized when two RS are in the TCI state.

26. The apparatus of claim 21, further comprising:
means for determining a scheduling offset threshold between a scheduling DCI and a scheduled PDSCH based on a frequency range.

27. A non-transitory computer-readable medium storing computer executable code at a user equipment (UE), the code when executed by a processor cause the processor to:
transmit, to a base station, an indication including a radio link monitoring (RLM) capability;
receive, from the base station, a RLM reference signal (RS) configuration for the UE, based on the indication; and
determine the RLM RS configuration for the UE, based on the RLM RS configuration received from the base station, wherein to determine the RLM RS configuration, the processor is configured to select at least one of explicit RLM RS as a synchronization signal block (SSB) or implicit RLM RS as a SSB, when the RLM capability indicates that the UE supports SSB based RLM.

* * * * *